(12) United States Patent
Friederich et al.

(10) Patent No.: US 8,348,572 B2
(45) Date of Patent: Jan. 8, 2013

(54) HOLE-FORMING AND THREAD-FORMING SCREW

(75) Inventors: Heinrich Friederich, Altenstadt (DE);
Michael Achenbach, Breidenbach (DE);
Eberhard Christ, Tambach-Dietharz (DE)

(73) Assignee: EJOT GmbH & Co. KG, Bad Laasphe (DE)

(*) Notice: Subject to any disclaimer, the term of this patent is extended or adjusted under 35 U.S.C. 154(b) by 563 days.

(21) Appl. No.: 12/307,504

(22) PCT Filed: Jul. 23, 2007

(86) PCT No.: PCT/EP2007/006534
§ 371 (c)(1),
(2), (4) Date: Jan. 5, 2009

(87) PCT Pub. No.: WO2008/012050
PCT Pub. Date: Jan. 31, 2008

(65) Prior Publication Data
US 2009/0311074 A1    Dec. 17, 2009

(30) Foreign Application Priority Data

Jul. 26, 2006 (DE) .................. 10 2006 034 584

(51) Int. Cl.
*F16B 25/10* (2006.01)
(52) U.S. Cl. .............. 411/387.1; 411/386; 411/411; 411/412; 411/424; 411/426; 411/452; 411/453
(58) Field of Classification Search .............. 411/73, 411/386, 387.1, 387.2, 387.4, 387.5, 387.8, 411/411–413, 415–416, 423–424, 426, 452–453, 411/DIG. 1, 387.7
See application file for complete search history.

(56) References Cited

U.S. PATENT DOCUMENTS

| 1,260,154 | A |   | 3/1918 | Day |
|---|---|---|---|---|
| 1,482,151 | A | * | 1/1924 | Rosenberg ................. 411/453 |
| 1,485,202 | A | * | 2/1924 | Rosenberg ................. 411/453 |
| 1,876,021 | A | * | 9/1932 | Quigley ....................... 29/271 |
| 2,382,019 | A | * | 8/1945 | Miller ......................... 411/378 |
| 3,109,691 | A | * | 11/1963 | Burkhardt ................... 439/125 |
| 3,827,331 | A | * | 8/1974 | Muenchinger ........... 411/387.4 |
| 4,185,486 | A |   | 1/1980 | Van Geffen |
| 4,241,638 | A | * | 12/1980 | Shimizu et al. ............. 411/386 |
| 5,015,134 | A | * | 5/1991 | Gotoh ......................... 411/386 |
| 5,127,785 | A | * | 7/1992 | Faucher ...................... 411/453 |
| 5,234,301 | A |   | 8/1993 | Grossberndt et al. |
| 5,242,253 | A | * | 9/1993 | Fulmer ........................ 411/386 |
| 5,863,167 | A | * | 1/1999 | Kaneko ....................... 411/426 |

(Continued)

FOREIGN PATENT DOCUMENTS

DE     78 32 983 U1    11/1978

(Continued)

*Primary Examiner* — Roberta Delisle
(74) *Attorney, Agent, or Firm* — Birch, Stewart, Kolasch & Birch, LLP

(57) ABSTRACT

A hole-forming and thread-forming screw for screwing into a sheet piece, including a slotted screw head for accommodating a tool, a threaded shank and a tapering hole-forming part having outer sides with a continuous convex-shaped curve along an entire length thereof, ribs running like threads along the hole-forming part being provided. The hole-forming part ends in a rounded, blunt end piece, and the rounded ribs, which chiplessly displace the material of the sheet part, are situated symmetrically opposite one another and have a pitch that is a multiple of the thread pitch.

20 Claims, 2 Drawing Sheets

U.S. PATENT DOCUMENTS

| | | | |
|---|---|---|---|
| 5,882,161 A | 3/1999 | Birkelbach | |
| 5,947,670 A | 9/1999 | Larson | |
| 6,086,303 A * | 7/2000 | Fluckiger | 411/399 |
| 6,155,761 A * | 12/2000 | Donovan | 411/386 |
| 6,428,258 B1 | 8/2002 | Osterle et al. | |
| 6,945,729 B2 * | 9/2005 | Yasuda | 403/408.1 |
| 7,114,902 B2 * | 10/2006 | Reiter | 411/412 |
| 7,232,283 B2 * | 6/2007 | Dill et al. | 411/453 |
| 7,334,975 B2 * | 2/2008 | Jungman et al. | 411/386 |
| 7,377,734 B2 * | 5/2008 | Bechtel et al. | 411/386 |
| 7,520,710 B2 * | 4/2009 | Ortler et al. | 411/440 |
| 2006/0041226 A1 * | 2/2006 | Ortler et al. | 604/96.01 |

FOREIGN PATENT DOCUMENTS

| | | |
|---|---|---|
| DE | 39 22 684 A1 | 1/1991 |
| DE | 295 05 903.6 U1 | 7/1995 |
| DE | 44 40 437 C1 | 2/1996 |
| DE | 195 25 732 A1 | 1/1997 |
| DE | 196 32 838 A1 | 2/1998 |
| DE | 196 34 417 C2 | 3/1998 |
| DE | 298 01 813 U1 | 4/1998 |
| EP | 0 464 071 B1 | 1/1992 |
| EP | 0 824 198 A1 | 2/1998 |
| EP | 0 939 235 A1 | 9/1999 |
| WO | WO-90/11485 A1 | 10/1990 |

* cited by examiner

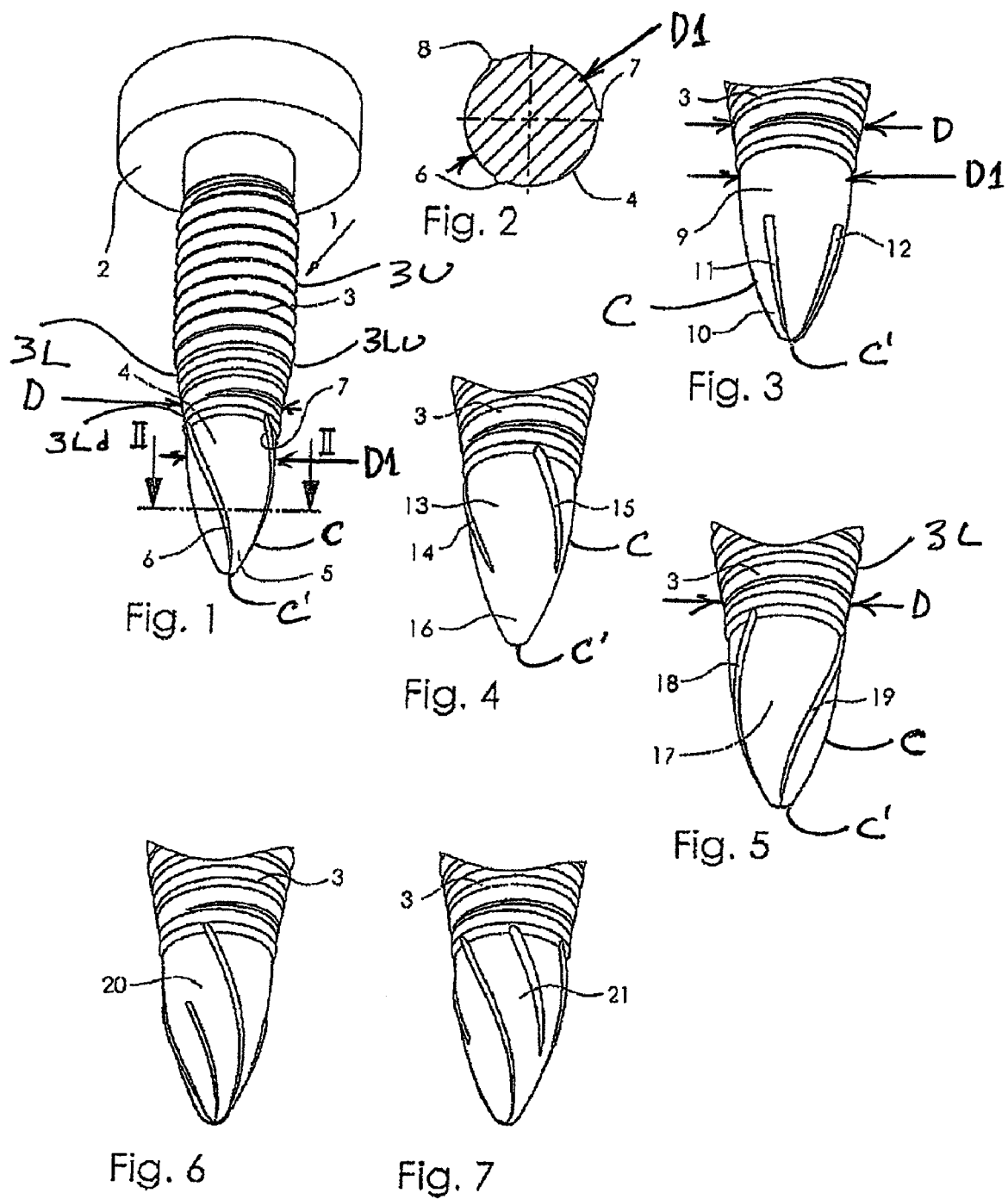

HOLE-FORMING AND THREAD-FORMING SCREW

The invention relates to a hole-forming and thread-forming screw comprising a slotted screw head for accommodating a tool, a threaded shank and a tapering hole-forming part having outer sides with a continuous convex-shaped curve C along an entire length thereof, ribs running like threads along the hole-forming part being provided.

A screw of this type is known from DE 196 32 838 A1. In this screw, ribs are provided which are designed as cutting edges and run like threads along a hole-forming part has a cylindrical-shaped upper portion, and a lower portion that tapers in a curved manner to a point, the pitch direction of these ribs corresponding to the pitch direction of the actual screw thread. Due to this design, the cutting edge mills a hole in a sheet piece when the screw is screwed into the sheet piece, until the screw thread ultimately reaches the milled hole and cuts the thread into the sheet piece.

A screw is also known from EP 0 464 071 which is used to introduce a hole in a non-cutting manner into a sheet piece by means of its hole-forming part, the sheet being deformed by turning the screw and thus by generating frictional heat. This known screw uses a hole-forming part having a cylindrically shaped upper portion, and a lower portion tapers in a curved manner that engages with the relevant sheet piece by means of a blunt end piece acting as a hole grinding part, whereby the rapid screw rotation heats the sheet piece until the material of the sheet piece yields to the blunt end piece and thereby forms a hole having a nozzle-like passage that extends axially on both sides of the sheet piece.

A thread-forming screw is also known from DE 195 25 732, which has a threaded shank and a tapering, conical hole-forming part having axial milling ribs that are intended to facilitate the screwing process upon initial screwing of a screw, in particular into a particle board or a wooden board. The milling ribs have a milling edge running along their outer sides which, as indicated by their name, are used to mill material out of the wooden board or particle board without applying axial forces that press the screw into the wooden board or particle board. The milling ribs therefore merely form a hole for accommodating the screw later on, i.e., they perform an action that goes beyond cutting the wood or the particle board.

The object of the invention is to design the screw mentioned above in such a way that the material of the sheet piece is not cut when penetrated by the hole-forming part, but instead is only displaced, so that the material may be retained for the formation of a passage on only one side of the sheet piece, the position of the passage being essentially selectable on either the side facing the screw or the side facing away from the screw.

According to the invention, this is achieved in that the hole-forming part ends in a rounded, blunt end piece and the rounded ribs, which chipless displace the material of the sheet piece, are situated symmetrically opposite each other and have a pitch that is a multiple of the thread pitch.

Due to the particularly steep ribs running along the hole-forming part, the sheet material tends to accumulate in front of the ribs and thereby promote the production of the passage, due to the pressure acting upon the screw while it is being screwed in. As a result, the formation of the passage is particularly pronounced on one side of the sheet. The ribs running like threads along the hole-forming part therefore have no cutting action, which is particularly desirable when correspondingly machining sheets, since it is usually extremely important to avoid chip formation when using sheets in a manufacturing process.

The ribs may be designed in such a way that they extend over the entire length of the hole-forming part or only over part of its length. In the latter case, the ribs are advantageously provided essentially over the initial region of the hole forming part, which is the part that is directly adjacent to the blunt end piece. However, it is naturally also possible for the ribs to essentially extend over the end region of the hole-forming part. This depends on the material of the sheet part, which enables ribs to be advantageously detected either in the initial region or end region of the hole-forming part, depending on experience with the machining thereof. It is also possible to select the pitch direction of the ribs in relation to the pitch direction of the thread of the threaded shank. It is therefore possible to orient the pitch direction in such a way that it matches the pitch direction of the thread of the threaded shank, which promotes a passage on the side of the sheet facing the screw. Alternatively, however, it is also possible to situate the ribs with regard to their pitch direction so that they are oriented in a direction opposite to the pitch direction of the thread of the threaded shank, which promotes the formation of the passage on the side of the sheet facing away from the screw.

Depending on the desired effect on the sheet and passage formation, the number of ribs in the front region of the hole-forming part may be different than the number of ribs in the rear region. In particular, if the number of ribs in the front region of the hole-forming part is greater than the number in the rear region, this results in the fact that the ribs apply a particularly strong tensile force to the screw to be screwed in, if the latter has already formed its hole by means of the blunt end piece.

To form the ribs, it is particularly suitable to press them out of the material of the hole-forming part. This may be achieved by pressing out each rib next to at least one groove pressed into the hole-forming part.

A particularly favorable way to shape the hole-forming part in the region of its end piece exists if the end piece has a coaxial indentation that is surrounded by a blunt edge whose outer diameter is 0.35 to 0.7 times smaller than the maximum diameter of the hole-forming part. In this case, a contact surface and thus a correspondingly great degree of heating is achieved, compared to point contact with a rounded, blunt end piece, when the screw is pressed against a sheet piece, which very quickly causes the sheet material to deform and the screw to penetrate the sheet part, thereby also forming the passage.

A length of less than 3 mm is sufficient as the indentation in the end piece of the hole-forming part, which is adequate in any case to accommodate material during softening of the sheet part.

However, note that the hole-forming part naturally may also be designed as a rounded, blunt end piece, which is significant, in particular, if the sheet part is made of a relatively soft material, such as aluminum.

Exemplary embodiments of the invention are illustrated in the figures, where:

FIG. 1 shows the screw having multiple ribs extending over the entire length of the hole-forming part, the pitch direction of these ribs being oriented in the opposite direction to the pitch direction of the threaded shank;

FIG. 2 shows a cross-sectional view along line II-II from FIG. 1;

FIG. 3 shows a hole-forming part that has ribs extending only over the initial region of the hole-forming part;

FIG. 4 shows a hole-forming part that has ribs extending essentially over the end region of the hole-forming part;

FIG. 5 shows a hole-forming part that has ribs extending over its entire length, whose pitch direction matches the pitch direction of the threaded shank;

FIG. 6 shows a hole-forming part that has ribs extending over the entire or only part of the hole-forming part, the short ribs being located in the initial region of the hole-forming part;

FIG. 7 shows a hole-forming part that has ribs extending over the entire or only part of the hole-forming part, the short ribs extending over the end region of the hole-forming part;

Figure 14A:
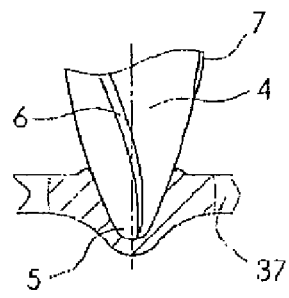

FIGS. 14a, b and c show the hole-forming part according to the screw illustrated in FIG. 1 in different phases of penetration of and passage through a sheet piece.

FIG. 1 shows a perspective view of hole-forming and thread-forming screw 1 according to the invention. The screw includes screw head 2, threaded shank 3 and hole-forming part 4, which is used for screwing into a sheet piece (See FIGS. 14a through c). Screw head 2 is provided with any type of known receptacle for a drive. Hole-forming part 4, which is situated below threaded shank 3, is provided with a convex shape and tapers toward end piece 5, which engages with a workpiece and is rotated for the purpose of screwing into the workpiece, in particular a sheet piece. End piece 5 in FIG. 1 is provided with a rounded, blunt design. When engaging with a workpiece, the rounded shape of end piece 5 ensures that the sheet piece may be heated so quickly that the material of the sheet piece flows and enables hole-forming part 4 to penetrate the sheet piece (in this regard, see FIGS. 14a through c).

Screw 1 illustrated in FIG. 1 is provided with a slotted screw head 2 at one end of the screw for accommodating a tool, a threaded shank 3 arranged below the slotted screw head 2, and a hole-forming part 4 arranged below the threaded shank 3 and having a blunt end piece 5 at an opposite end of the screw 1. The hole-forming part 4 has a length extending between a lower end of the threaded shank 3 and the blunt end piece 5. Ribs 6 and 7 run like threads along the entire length of the hole-forming part 4. The hole-forming part 4 has a circular cross section along its entire length, and has a diameter D1 which gradually and steadily decreases in size from the upper end thereof, where diameter D1 is the largest, to the lower end thereof where the diameter D1 is the smallest. Therefore, when the screw 1 is viewed in any side view, the hole-forming part 4 can be seen to have outer sides with a continuous convex-shaped curve C along an entire length thereof, which join another convex-shaped curve C' around the rounded end of the blunt end piece 5. The threaded shank 3 has an upper section 3U and a lower section 3L. A diameter D of a lower section 3L gradually decreases in size as from an upper end 3Lu thereof adjoining the upper section 3U, to a lower end 3Ld thereof adjoining the hole-forming part 4. Ribs 6 and 7 are situated symmetrically to the axis of the screw, as shown in the cross-sectional drawing according to FIG. 2.

According to FIG. 2, these are three symmetrically arranged ribs 6, 7 and 8. When screw 1 is screwed into a sheet part, ribs 6, 7 and 8 displace the sheet part material softened by heating and thereby form a passage (see FIGS. 14b and c) whose direction is influenced by the pitch of ribs 6, 7 and 8. In the screw according to FIG. 1, the pitch of ribs 6, 7 and 8 runs in the opposite direction to the pitch direction of the thread of threaded shank 3. The ribs thus displace material from the sheet piece toward the front and produce a passage that is essentially on the side of the sheet part opposite to the screw-in direction (see FIG. 14c). Ribs 6, 7 and 8 perform an exclusively material-deforming action, and therefore do not remove material of the sheet piece by scraping or the like, so that all the material formed from the sheet part is transferred to the passage.

FIG. 3 shows a screw having a hole-forming part 9, which is provided with shortened ribs 11 and 12 in its region facing end piece 10. In the case of sheet part material that is not particularly hard, these shortened ribs 11 and 12 may be used to particular advantage.

FIG. 4 shows an additional modification of the design according to FIG. 1, in which the ribs are also shortened, in this case extending over the end region of the hole-forming part. Ribs 14 and 15 extend from the beginning of the thread of threaded shank 3 approximately to the middle of hole forming part 13. Due to this design, pressing the screw according to FIG. 1 against a sheet part initially produces friction and heating of the contact point between the sheet part and the screw, on the basis of which end piece 16 is pressed into the material of the sheet piece until ribs 14 and 15 additionally displace material from the sheet piece and form the passage in the desired manner.

FIG. 5 shows a design of a screw that is similar to the screw according to FIG. 1, in which, however, the pitch of ribs 18 and 19 extending over entire hole-forming part 17 is opposite to the pitch direction of the thread of threaded shank 3. As a result, when the screw according to FIG. 5 engages with a sheet piece, a passage is formed which lies prominently on the side of the sheet piece on which the screw is engaged.

FIGS. 6 and 7 show two modifications of screws according to the exemplary embodiments discussed above, in which the ribs are of varying lengths. According to FIG. 6, long and short ribs are namely provided, the short ribs being located in the initial region of hole-forming part 20, while in the design according to FIG. 7, the short ribs are situated in the end region of hole-forming part 21. The application of the particular screw designs described above depends on the specific material properties of the underlying sheet part.

FIGS. 8 through 11 show a design of the hole-forming part having ribs, in which a particularly advantageous means of producing the ribs is provided.

Figure 8:
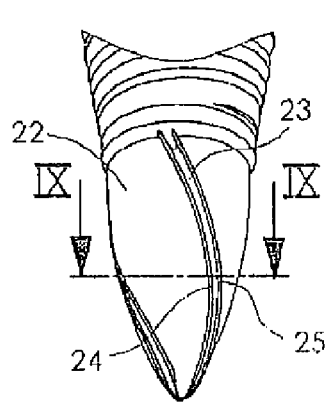
FIG. 8 shows a hole-forming part that has a rounded, blunt end piece and ribs pressed out of a groove.
Figure 9:
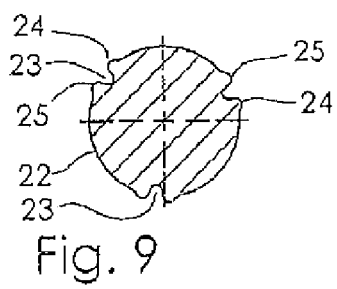
FIG. 9 shows a cross-sectional view along line IX-IX from FIG. 8.

Hole-forming part 22 according to FIG. 8, which corresponds, in principle, to the screw design according to FIG. 1, shows two parallel ribs running close together which are produced by pressing a corresponding groove 23 into hole-forming part 22, the groove ensuring on the basis of material displacement that the two parallel ribs 24 and 25 form along the side of groove 23. This design is also illustrated in the cross-sectional drawing according to FIG. 9, which shows a cross-sectional view along lines IX-IX from FIG. 8.

Figure 10:
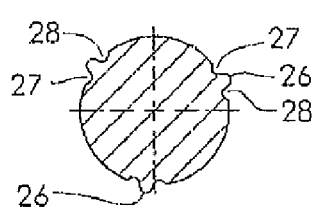
FIG. 10 shows a similar cross-sectional view that has ribs pressed out of two side grooves.
Figure 11:
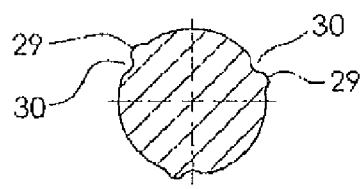
FIG. 11 shows a similar cross section of a hole-forming part, in which the ribs are pressed out by only one rib on one side.

Ribs of this type may also be formed in a different manner, as illustrated by FIGS. 10 and 11. According to FIG. 10, which shows a cross-sectional view similar to the one according to FIG. 9, a rib 26 is produced by grooves 27 and 28 pressed into the side adjacent thereto.

A variant thereof is shown in FIG. 11, according to which a rib 29 is essentially produced by pressing in a one-sided groove 30 that runs on the side adjacent thereto.

Figure 12:
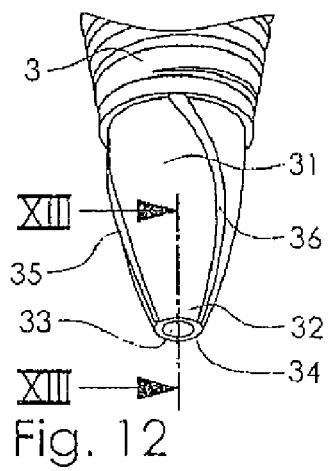
FIG. 12 shows a hole-forming part that has a coaxial indentation in its end piece.
Figure 13:
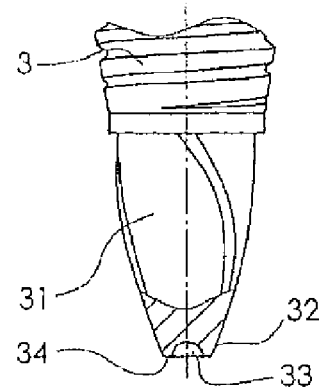
FIG. 13 shows a cross-sectional view along line XIII-XIII from FIG. 12.

FIGS. 12 and 13 show a design of hole-forming part 31, which is provided in its end piece 32 with a coaxial indentation 33 surrounded by a blunt edge 34, which ensures that a relatively large area is immediately available for producing frictional heat when hole-forming part 31 engages with a sheet piece. This design improves the initial penetration of hole-forming part 31 into a sheet piece until ribs 35 and 36 engage and cause the sheet material to be deformed accordingly, as described in this connection on the basis of the exemplary embodiments discussed above. In this regard, FIG. 13 shows a cross-sectional view along line XIII-XIII from FIG. 12.

Figure 14B:
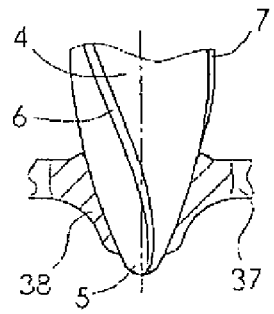
Figure 14C:
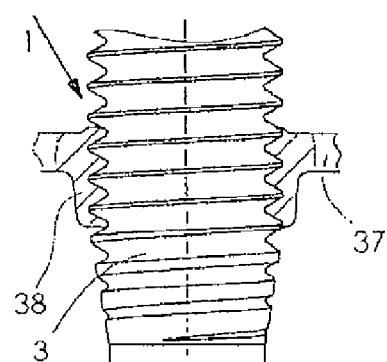

FIGS. 14a through c show a screw being screwed into a sheet piece and a passage being formed, based on the screw design illustrated in FIG. 1. According to FIG. 14a, blunt end piece 5 of hole-forming part 4 has partially penetrated sheet piece 37. According to FIG. 14b, hole-forming part 4 has bored all the way through sheet piece 37, so that ribs 6 and 7 now act upon the material of sheet piece 37 and form it into a passage 38. FIG. 14c then shows the end phase of screw penetration, in which threaded shank 3 of the screw has passed all the way through sheet piece 37 and thereby formed passage 38, which essentially extends into sheet piece 37 in the direction of screw penetration.

The invention claimed is:

1. A hole-forming and thread-forming screw for screwing into a sheet piece, comprising:
   a screw head at one end of the screw for accommodating a tool,
   a threaded shank arranged below the screw head,
   a hole-forming part having a circular cross-section along an entire length thereof, the length extending directly from the threaded shank to a blunt end piece at an opposite end of the screw, the hole-forming part having a diameter (D1) which gradually and steadily decreases in size from the upper end thereof, where diameter (D1) is the largest, to the lower end thereof where the diameter (D1) is the smallest, so that when the screw is viewed in a side view, the, hole-forming part can be seen to have outer sides with a continuous convex-shaped curve along the entire length thereof, extending from the threaded shank to the blunt end piece, and
   a plurality of rounded ribs running like threads are provided along at least a portion of the length of the hole-forming part, and
   the plurality of rounded ribs, which chiplessly displace material of the sheet piece, are situated symmetrically which respect to each other and have a pitch that is a multiple of a thread pitch of the threaded shank.

2. The screw according to claim 1, wherein the ribs extend over the length of the hole-forming part.

3. The screw according to claim 2, wherein the ribs have a pitch direction that matches a pitch direction of the thread pitch of the threaded shank.

4. The screw according to claim 2, wherein the ribs have a pitch direction that is oriented in an opposite direction to a pitch direction of the thread pitch of the threaded shank.

5. The screw according to claim 2, wherein the blunt end piece has a rounded end.

6. The screw according to claim 1, wherein the ribs extend over part of the length of the hole-forming part.

7. The screw according to claim 6, wherein the ribs extend over an initial region of the hole-forming part.

8. The screw according to claim 6, wherein the ribs extend over an end region of the hole-forming part.

9. The screw according to claim 6, wherein a number of ribs in a front part of the hole forming part is different than a number of ribs in a rear region.

10. The screw according to claim 6, wherein the ribs have a pitch direction that matches a pitch direction of the thread pitch of the threaded shank.

11. The screw according to claim 6, wherein the ribs have a pitch direction that is oriented in an opposite direction to a pitch direction of the thread pitch of the threaded shank.

12. The screw according to claim 1, wherein the ribs have a pitch direction that matches a pitch direction of the thread pitch of the threaded shank.

13. The screw according to claim 1, wherein the ribs have a pitch direction that is oriented in an opposite direction to a pitch direction of the thread pitch of the threaded shank.

14. The screw according to claim 1, wherein the ribs each run next to at least one groove pressed into the hole-forming part and are pressed out of the at least one groove.

15. The screw according to claim 1, wherein the blunt end piece includes a coaxial indentation which is surrounded by a blunt edge whose outer diameter is 0.35 to 0.7 times smaller than a maximum diameter of the hole-forming part.

16. The screw according to claim 15, wherein the indentation is less than 3 mm long.

17. The screw according to claim 1, wherein the blunt end piece has a rounded end.

18. The screw according to claim 17, when the screw is viewed in side view, the hole-forming part can be seen to have the convex-shaped curve (C) along the entire length of the hole-forming part, the convex-shaped curve (C) joining another convex-shaped curve (C') around the rounded end of the blunt end piece of the hole-forming part.

19. The screw according to claim 1, wherein the threaded shank has an upper section and a lower section, and
   a diameter (D) of the lower section gradually decreases in size from an upper end thereof where the diameter (D) is the largest, to a lower end thereof where the diameter (D) is the smallest.

20. A hole-forming and thread-forming screw for screwing into a sheet piece, comprising:
   a screw head at one end of the screw for accommodating a tool,
   a threaded shank arranged below the screw head,
   a hole-forming part having a circular cross-section along an entire length thereof, the length extending directly from the threaded shank to a blunt end piece at an opposite end of the screw, the hole-forming part having a diameter (D1) which gradually and steadily decreases in size from the upper end thereof, where diameter (D1) is the largest, to the lower end thereof where the diameter (D1) is the smallest, and
   a plurality of rounded ribs running like threads are provided along the hole-forming part, and
   the plurality of rounded ribs are situated symmetrically which respect to each other and have a pitch that is a multiple of a thread pitch of the threaded shank,
   wherein the plurality of rounded ribs are only three ribs, each of which extends along the entire length of the hole forming part from the threaded shank to a rounded end of the blunt end piece.

* * * * *